May 1, 1956 J. R. FURRER 2,743,943
THREE PRONG RESILIENT COUPLING DEVICE
Filed Feb. 8, 1952 3 Sheets-Sheet 1
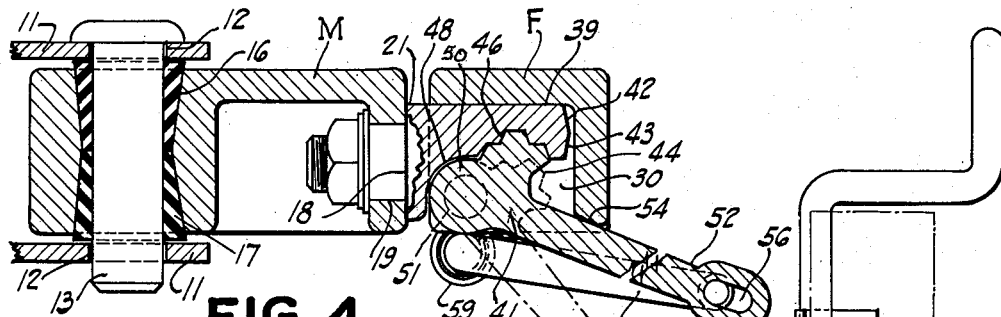
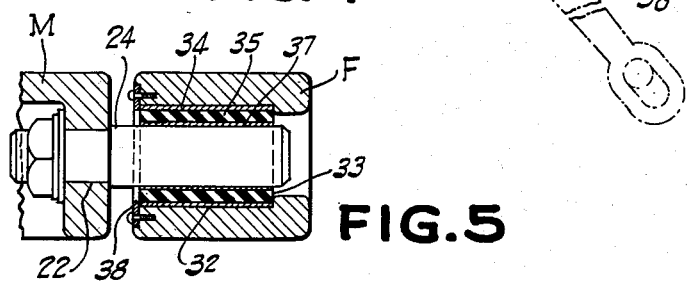
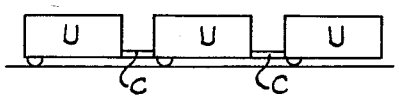
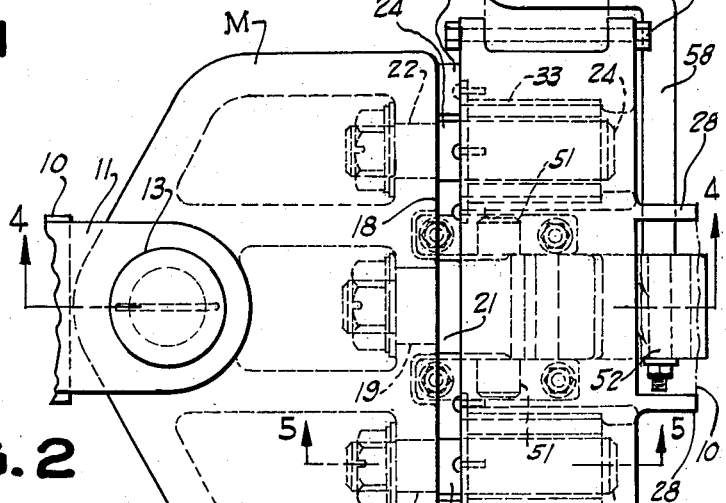
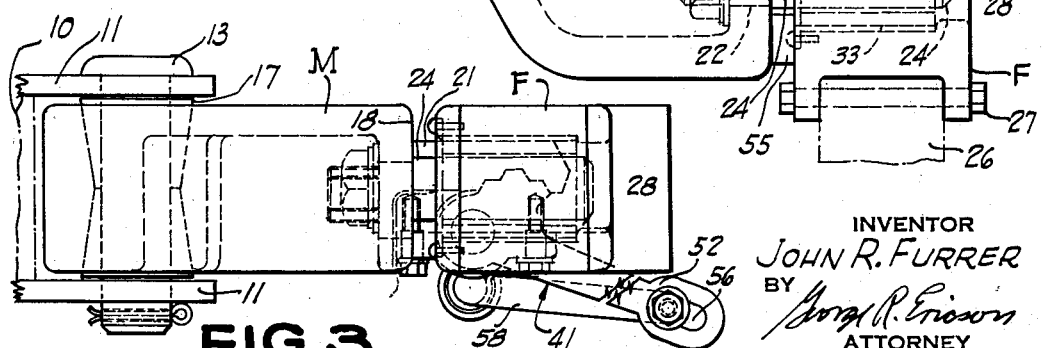
INVENTOR
JOHN R. FURRER
BY
ATTORNEY May 1, 1956 J. R. FURRER 2,743,943
THREE PRONG RESILIENT COUPLING DEVICE
Filed Feb. 8, 1952 3 Sheets-Sheet 2

INVENTOR
JOHN R. FURRER
BY
George R. Ericson
ATTORNEY

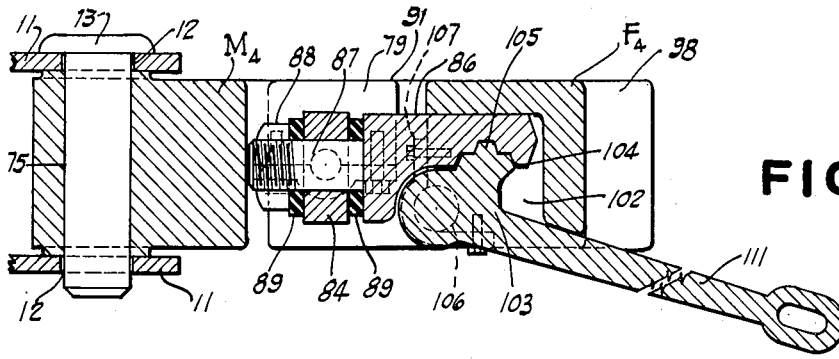
FIG.12
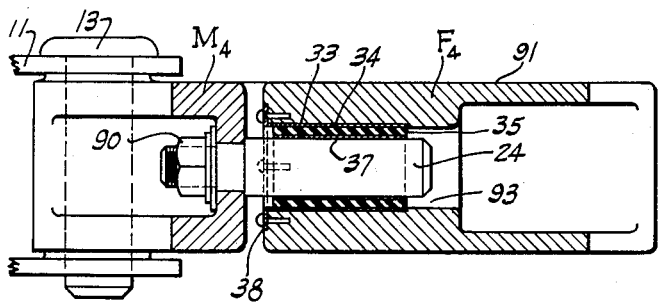
FIG.11
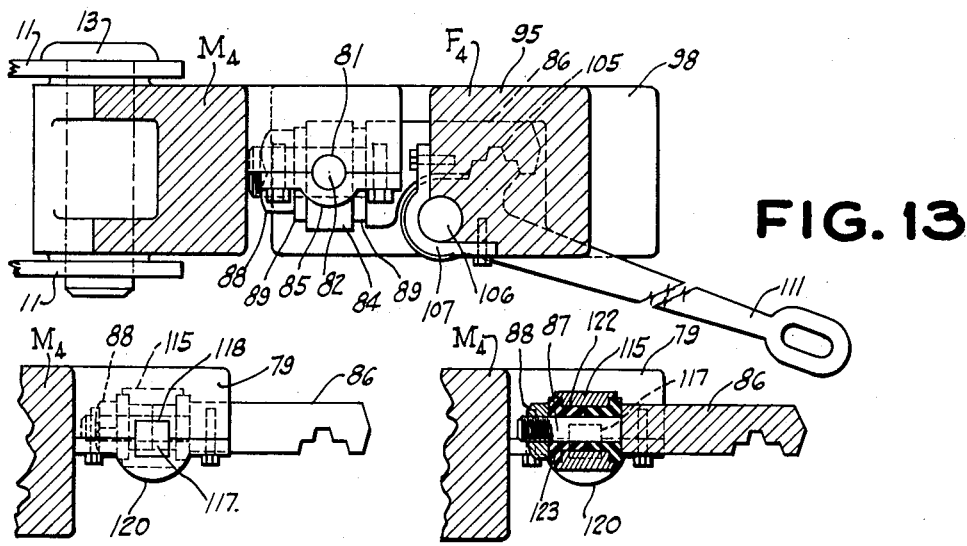
FIG.13
FIG.14  FIG.15

United States Patent Office 2,743,943
Patented May 1, 1956

2,743,943

THREE PRONG RESILIENT COUPLING DEVICE

John R. Furrer, Milwaukee, Wis., assignor to ACF Industries, Incorporated, a corporation of New Jersey Application February 8, 1952, Serial No. 270,632

9 Claims. (Cl. 280—485)

This application is a continuation-in-part of my application Serial No. 251,851, now abandoned, and relates to coupling devices for trailer-type vehicles in which an end of one of the coupled vehicles is supported by the abutting end of the adjoining vehicle.

In vehicles of this type, particularly trailer units of articulated railroad cars, it has been the practice to provide the units with centrally located draft appliances and to mount weight supporting devices on the trailer unit ends at some distance from the center of the car. The weight supporting devices have consisted of a pair of horizontal cylinders mounted for rotation about a vertical axis at the end of one of the units, and a pair of cylindrical sockets for slidably receiving the cylinders, the sockets being similarly mounted for rotation about a vertical axis on the other trailer unit, both cylinders and sockets being provided with yieldable means permitting limited cushioned vertical movement. It has been found that due to the slidable relation between the weight supporting cylinders and sockets presently in use that there is considerable wear on these members. This has resulted in substantially increasing the amount of maintenance required on trains of this type, frequent lubrication of these members being desirable; this is obviously impractical in view of the fact that each train has a large number of these weight bearing devices. A further disadvantage of the present coupling means for trains of this type is that the draft appliances are not self-locking.

It is, therefore, an object of this invention to provide a draft appliance for vehicles of this type which is self-locking, regardless of direction of movement of the train.

It is a further object to provide means whereby the weight of one trailer may be partially borne by the end of another trailer, which means will have improved wearing properties as compared with the present weight bearing devices and which will thus require a minimum of maintenance and lubrication.

A further object is to provide mating weight bearing devices which are rigidly mounted with respect to each other when the trailer units are coupled and which, consequently, are substantially less subject to wear.

Another object is to include separate weight supporting and draft means in a single device to permit simultaneous and automatic joining of the cooperating weight supporting and draft means in a single coupling operation.

A still further object of the invention is to provide a coupling device which will virtually eliminate relative longitudinal movement between the coupled units, make the coupled units substantially rigid laterally with respect to each other while still permitting a slight relative lateral rotation in the vertical plane, permit limited longitudinal rotation in the vertical plane so that the coupled unit may easily conform to major vertical configurations of the roadbed and permit change of direction of coupled units with respect to each other so that the coupled units may round curves.

These and other objects of the invention will be apparent to those skilled in the art from a study of the following description and accompanying drawings, in which:

Fig. 1 shows a general view of a portion of an articulated car consisting of two-wheeled trailer units.

Fig. 2 is a plan view of the coupling device.

Fig. 3 is an elevational view of the coupling device.

Fig. 4 is a vertical sectional view along the lines 4—4 of Fig. 2.

Fig. 5 is a vertical sectional view along the lines 5—5 of Fig. 2.

Fig. 11 is a longitudinal vertical sectional view of the modified coupling device taken along the line 11—11 of Fig. 10.

Fig. 12 is a longitudinal vertical sectional view of the modified coupling device taken along the line 12—12 of Fig. 10.

Fig. 13 is a longitudinal vertical sectional view of the modified coupling device taken along the line 13—13 of Fig. 10.

Fig. 14 is a fragmentary vertical sectional view corresponding to Fig. 13 but showing a modified draft tongue mounting means.

Fig. 15 is a longitudinal vertical section taken along the center line of the modified draft tongue mounting means of Fig. 14.

Figure 6:
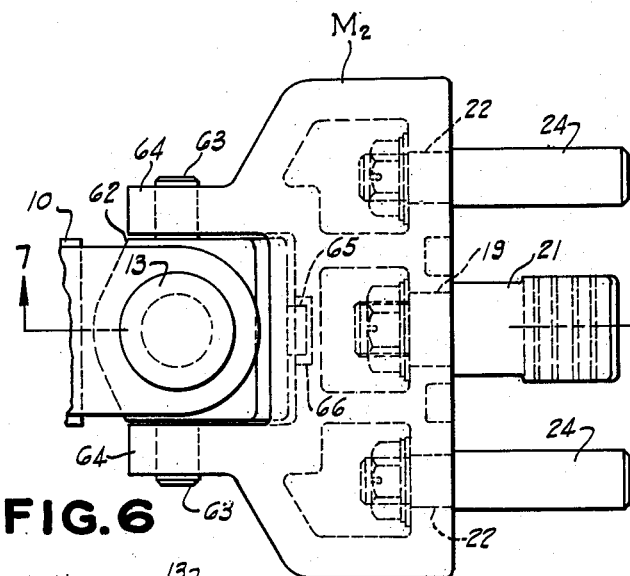
Fig. 6 is a plan view of the male member of the type shown in Figs. 2–5 provided with a modified mounting means.

Referring now to the drawing, Fig. 1 shows a diagrammatical view of an articulated railway car consisting of a plurality of two-wheeled units U each having its wheels at one end, so that the unwheeled end of one unit is connected to and supported on the wheeled end of the adjacent unit by a coupling device C which is shown in detail in Figs. 2–5.

In Fig. 2 the center sill 10 of one of the trailer units U is formed with a pair of vertically spaced horizontal lip portions 11 each having a centrally located cylindrical opening 12 to receive coupler pivot pin 13 for pivotally mounting male coupler member M on center sill 10. As best shown in Fig. 4, the opening 16 in coupler member M is substantially larger in diameter than pivot pin 13 and is in the shape of a pair of abutting coaxial truncated cones so that opening 16 has its maximum diameter at the ends and its minimum diameter at the middle. The space intervening between pin 13 and the conical walls of opening 16 is occupied by a sleeve 17 of resilient material such as rubber so that a limited universal movement of member M is permitted about pin 13. The male coupler member M is formed with a flat transverse vertical end face 18 having a relatively large central cylindrical opening 19 for pivotally and removably mounting draft tongue 21 which will be described in detail below, and a pair of smaller cylindrical openings 22, one of which is located on either side of central opening 19. Openings 22 provide mountings for cylindrical removably mounted weight supporting stems 24, the function of which will be described more fully below.

The female member of the coupling device is generally designated by the letter F and may be recessed into an end sill 26 of trailer units U and may be secured to the end sill by bolts 27, so that member F in effect forms the central portion of end sill 26, the outer transverse vertical face of member F being substantially flush with end sill 26. Member F is formed with brackets 28 for attachment to the trailer center sill 10 and has a central rectangular recess 30 adapted to receive tongue 21, and a pair of cylindrical openings 32 at either side of the central opening, openings 32 being coaxial with weight supporting stems 24 of male member M. Openings 32 are substantially larger in diameter than stems 24 and are adapted to receive a removable and replaceable resilient bushing assembly 33 consisting of an outer metal shell 34 of substantially the same diameter as cylindrical opening 32, a rubber sleeve 35 and an inner metal liner 37 of bronze or other bearing metal, liner 37 being substantially of the same diameter as stems 24 and adapted to receive stems 24, whereby vertical loads are resiliently transmitted between coupler member M and F. Bushing assemblies 33 are removably secured in openings 32 by rings 38 and screws or other suitable fastening means.

The traction or draft portion of the coupling device consists essentially of tongue 21, the upper wall 39 of rectangular recess 30 and a pivoted locking member 41. Tongue 21 is of substantially rectangular cross section and is formed with a slightly sloping upper surface adapted to slidably engage the similarly slightly sloping upper wall 39 of recess 30. This arrangement results in a wedging relation between the tongue and the recess, which may be enhanced by similarly sloping the sides of the tongue and the side walls of the recess inwardly. The outer end of tongue 21 is beveled as at 42 to facilitate admission to recess 30 and as at 43 to slidably engage and pass over the projecting teeth of latch portion 44 of locking member 41. The bottom surface of tongue 21 is formed with a notch 46 having inwardly converging sloping stepped side walls and a substantially flat bottom wall. The remainder of the lower surface of tongue 21 is curved as at 48 to provide space for the hub portion 50 of locking member 41. Locking member 41 is provided with a pair of transverse outwardly extending trunnions 51 which are removably journalled in the side walls of recess 30, projecting latch portion 44 and an operating arm 52. Latch portion 44 is formed with a surface substantially identical with and adapted for registry with notch 46 of tongue 21, and latch member 41 is normally urged into the position illustrated in Fig. 4, with the cooperating surfaces of notch 46 and projecting latch portion 44 in registry with each other. The arrangement and proportions of wall 39, tongue 21 and latch member 41 are such that when this occurs, tongue 21 will be securely locked in position between wall 39, and latch portion 44, and arm 52 of the locking member will be in abutting engagement with stop 54.

The coupler faces are provided with resilient buffer elements 55. In the coupled position, buffer elements 55, being compressed between the coupler faces, tend to urge the male and female members apart, thereby tending to urge tongue 21 out of recess 30. Tongue 21 in turn urges latch portion 44 counter-clockwise so as to tighten the grip of wall 39 and latch portion 44 on the tongue. When in the coupled position, buffer elements 55 also prevent longitudinal play between the coupled units.

The end of operating arm 52 is formed with a slot 56 to receive an end of operating crank 58, which is suspended from the underside of the vehicle by brackets 59. Torsion springs 61, mounted on operating lever 58 and abutting on brackets 59 normally urge the end portion of operating crank 58 upwardly, thus urging latch member 44 into at least partial engagement with the leading edge of notch 46, whereby the tongue is held within recess 30 preparatory to completion of the locking operation. The outer end of operating crank 58 may be used as a handle to rotate the operating lever upwardly to engage stop 54 and simultaneously to exert a camming action in notch 46 whereby tongue 21 is drawn to the right to the locked position best shown in Fig. 4, and at the same time, compressing buffer elements 55 between the opposing coupler faces. Operating crank 58 may be rotated downwardly to disengage latch member 41 from tongue 21 for uncoupling, as shown in dotted lines in Fig. 4.

Operation of the device is as follows:

With male member M aligned with center sill 10 of its trailer unit, the trailer unit is pushed towards the adjoining trailer unit so that stems 24 and tongue 21, being substantially aligned with corresponding openings in the face of female member F on the adjoining unit, enter their respective openings. As stems 24 advance in bushings 33, tongue 21 advances in recess 30, its upper surface slidably engaging upper wall 39 of the recess and its lower surface engaging projecting latch portion 44 of locking member 41, thus urging locking member 41 in a clockwise direction to the position shown in dotted lines in Fig. 4 until projecting latch portion 44 is in at least partial registry with notch 46. When this occurs, torsion spring 61 acting through operating crank 58 will have moved latch portion 44 into at least partial engagement with notch 46 so that members M and F will not separate. Operating crank 58 is then rotated upward manually until operating arm 52 engages stop 54, whereby the sloping side walls of the latch portion 44 exerts camming action on the sloping side walls of the notch 46, forcing the tongue to the right to the locked position best shown in Fig. 4, and at the same time, compressing buffer 55 between the opposing faces of members M and F. It is evident that when a pulling force is exerted on either of the coupled units, the relationship between tongue 21 and locking member 41 is such that locking member 41 will be urged counter-clockwise thereby tightening its grip on tongue 21. The draft device consisting of tongue 21, locking member 41 and associated elements functions only to transmit longitudinal forces between the units, but is capable of supporting the weight of the adjoining unit should the need arise. Since the units are two-wheeled, it is necessary to provide means for supporting the weight of the unwheeled end of one unit on the wheeled end of the adjoining unit, and for this purpose, stems 24 and resilient bushings 33 are provided. During movement of the train, limited relative rotation between the cars is permitted by and absorbed in bushings 33. Since during operation of the train, adjoining units frequently sway in opposite directions simultaneously, resilient bushings 33 permit limited downward motion of one of the stems 24 and simultaneous upward movement of the other stem with respect to female member F. Since tongue 21 is rigidly locked in the female member, its pivotal mounting in opening 19 of the male member M permits the required relative rotation between male and female members. Further relative movement between the adjoining units is permitted by the rubber sleeve 17 surrounding pivot pin 13.

Figure 7:
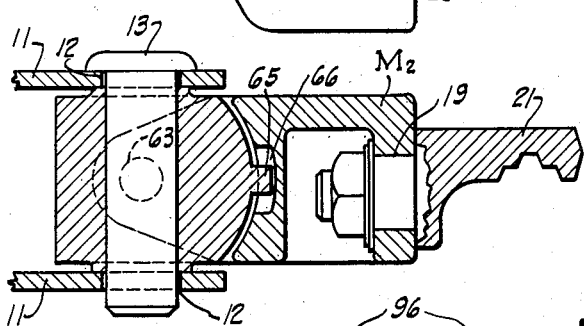
Fig. 7 is a vertical sectional view along the line 7—7 of Fig. 6.

Figs. 6 and 7 illustrate a modified mounting means for the male coupler member, in which the rubber bushings surrounding the pivot pin are eliminated. In this modification trunnion block 62 is formed with a cylindrical vertical pivot hole to receive pivot pin 13. Block 62 also has a pair of transversely extending trunnions 63 which are rotatably journalled in bracket 64 of the male coupler head M₂, whereby rotation of the male coupler head in the vertical longitudinal plane is permitted. As best shown in Fig. 7 the adjoining surfaces of block 62 and member M₂ are of arcuate form and are provided respectively with a boss 65 and cooperating recess 66 for the purpose of limiting relative rotation between the coupler head and trunnion block. Operation of the modified male member M₂ of Figs. 6 and 7 is in all respects identical with that of the coupler illustrated in Figs. 2–5 with the exception that vertical longitudinal rotation between the coupled units due to undulations in the track structure and other causes is permitted by the pivotal mounting 63, 64, rather than by the rubber bushing 17.

Figure 8:
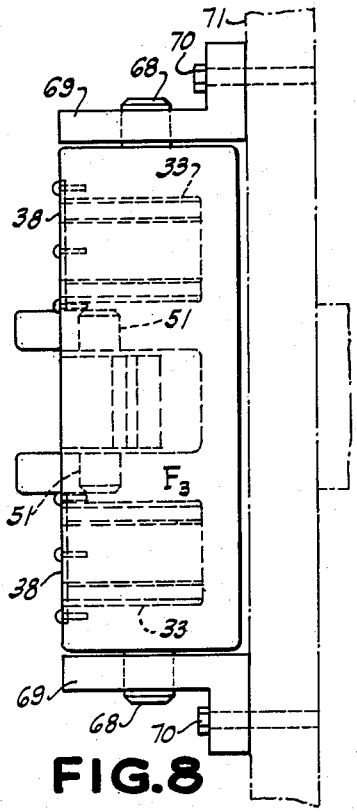
Fig. 8 is a plan view of the female member of the type shown in Figs. 2–5 with the addition of pivotal mounting means.
Figure 9:
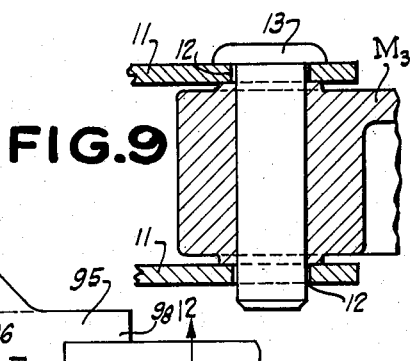
Fig. 9 is a longitudinal vertical section along the center line of male coupler member of the type illustrated in Figs. 2–5 adapted for use with the pivoted female member of Fig. 8.
Figure 10:
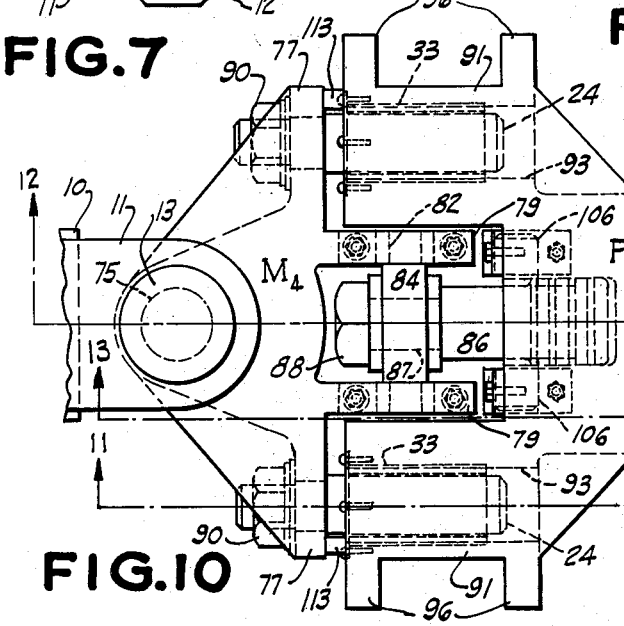
Fig. 10 is a plan view of a modified form of coupling device.

Figs. 8 and 9 illustrate, respectively, male member F₃ having a fixed non-resilient vertical pivot, and a female member M₃ mounted for rotation about a transverse horizontal pivot. Female member F₃ is formed with a pair of transversely extending trunnions 68 which are rotatably journalled in mounting brackets 69. Mounting brackets 69 are secured by bolts 70 or other suitable securing means to the car underframe 71. Operation of the coupler of Figs. 8 and 9 is identical with that of Figs. 2–5 with the sole exception that vertical rotation in the longitudinal plane of the train is permitted by the transverse pivotal mounting of the female member F₃ rather than by resilient mounting of the vertical pivot pin.

It will be understood that applicant does not intend to limit himself to the specific pivotal mountings shown and described inasmuch as the desired result might be readily achieved by any of several variations in the pivotal mounting means such as by mounting the male member on a transversely extending pivot and mounting the female member on a vertical pivot, or by mounting the male member rigidly with respect to its car and mounting the female member for limited rotation in both the horizontal and vertical planes.

A modified coupling device is shown in Figs. 10–13. In this coupler the rubber bushing surrounding the pivot pin of the male member is eliminated, relative rotation between the cars in the longitudinal vertical plane being permitting by mounting the draft tongue for limited rotational movement in the longitudinal vertical plane with respect to the male coupler member. In this modification the draft tongue is mounted on the male member with extensions of its horizontal pivotal axis substantially bisecting the longitudinal and diametric axes of the working part of the weight bearing device so that the working parts of the weight bearing devices rotate about their dead centers. This permits maximum utilization of the elasticity of the rubber bushings of the weight bearing devices. It is evident that if the pivotal axis were substantially above, below, beyond, or behind the dead centers of the weight bearing devices no effective rotation would be possible. Referring now to Figs. 10–13 it will be noted that the male coupler member M₄ is formed with a cylindrical rather than a double tapered pivot hole 75, and that there are no bushings interposed between pivot pin 13 and coupler member M₄, the size of hole 75 being merely large enough to permit rotation of the coupler member about the pin.

Coupler member M₄ is formed with a pair of suitably braced lateral extensions 77 to mount weight bearing stems 24, and a pair of spaced, centrally located longitudinal projections 79 to serve as a mounting for the draft tongue. Longitudinal projections 79 are formed with co-axial semi-circular openings 81 in their lower edges to rotatably receive trunnions 82 of draft tongue mounting member 84. Trunnions 82 are retained in openings 81 by brackets 85 which are secured to the lower edge of projections 79. Draft tongue 86 is of substantially rectangular transverse section and is formed with a cylindrical extension 87 which passes through a hole in draft tongue mounting member 84. The outer end of extension 87 is threaded to receive a nut 88 for securing draft tongue 86 to mounting member 84. In order to provide cushioning against longitudinal shock metal faced rubber washers 89 are interposed, respectively, between the mounting member 84 and draft tongue 86 and lock nut 88.

Lateral extensions 77 of member M₄ are formed with cylindrical openings in their faces to receive threaded longitudinal extensions of weight bearing stems 24, which may be secured in place by nuts 90.

The female member F₄, viewed from above is of generally U-shape, the legs 91 of the U being provided with openings 93 to receive weight bearing stems 24, the space between the legs being adapted to receive longitudinal projections 79 and the accompanying draft tongue mounting means, and the base 95 of the U being provided with a cavity to receive the draft tongue and locking means therefor. Legs 91 of the female member may be provided with brackets 96 for attachment to the end sill or corresponding member of the car, and base 95 may be provided with longitudinally extending members 98 for attachment to the center sill of the car so that the female member F₄ may in effect form a portion of the car underframe.

The legs 91 of member F₄ are formed with cylindrical openings 93 to receive the weight bearing stems 24. Openings 93 are of substantially greater diameter than stems 24 and are adapted to receive a removable and replaceable resilient bushing assembly 33 consisting of an outer metal shell 34 of substantially the same diameter as cylindrical opening 93, a rubber sleeve 35, and an inner metal liner 37 of bronze or other bearing metal. Liner 37 is substantially of the same diameter as stems 24, and is adapted to receive stems 24, whereby vertical loads are resiliently transmitted between coupler members M₄ and F₄. Bushing assemblies 33 are removably secured in openings 93 by rings 38 and screws or other suitable fastening means.

The base portion 95 of female member F₄ is formed with a cavity 102 to receive draft tongue 86. The traction or draft portion of the coupling device is similar in construction and operation to that of Figs. 2–5 and consists essentially of draft tongue 86, the upper wall of cavity 102, and a pivoted locking member 103. The lower face of tongue 86 is formed with a notch 104 which is adapted to register with latch portion 105 of locking member 103. Locking member 103 is formed with transversely extending trunnions 106 which are rotatably mounted in the side walls of cavity 102 by suitable mounting brackets 107 which are secured to the bottom surface of member F₄. Latch portion 105 of locking member 103 has a substantially identical contour with notch 104 of the draft tongue to facilitate locking engagement therewith.

The same operating means as is shown in Fig. 2 may be used with the modification of Figs. 10–13. It consists of a spring loaded operating crank 58 normally urging locking member arm 111 (as best seen in Fig. 12) counter-clockwise and thus automatically causing at least a partial engagement of latch portion 105 with notch 104 of the draft tongue, the coupling operation being completed manually by rotating the crank upwardly, thus bringing latch portion 105 into complete registry with notch 104 and wedging draft tongue 86 against the upper wall of cavity 102.

The coupler faces are provided with resilient buffer elements 113 to cushion the shock on coupling. In the coupled position buffer elements 113, being compressed between the coupler faces, tend to urge the male and female members apart, thereby tending to urge tongue 86 out of cavity 102. Tongue 86 in turn urges latch portion 105 counterclockwise so as to tighten the grip of the upper wall of cavity 102 and latch portion 105 on the tongue. When in the coupled position, buffer elements 113 also tend to prevent longitudinal play between the coupled units.

Operation of the device of Figs. 10–13 is as follows:

With the male member M₄ aligned with center sill 10 of its trailer unit, the trailer unit is pushed towards the adjoining trailer unit so that stems 24 and tongue 86, being substantially aligned with corresponding openings in the face of female member F₄ on the adjoining unit, enter their respective openings. As stems 24 enter openings 93 in female member F₄ the beveled end portion of draft tongue 86 protrudes into cavity 102 of the female member, overriding locking member 103 which is resiliently urged towards registry with notch 104 by spring loaded operating crank 58. The coupling operation is completed by manually rotating crank 58 until, as disclosed above, latch portion 105 is in complete registry with notch 104 whereby all longitudinal movement of draft tongue 86 with relation to the female member F4 is prevented due to the wedging action of latch portion 105 and the upper surface of cavity 102. When the trailer units are operated as a train, relative transverse rotation between the cars is permitted by the longitudinal pivotal relation between draft tongue 86 and draft tongue mounting member 84. Relative rotation between the trailer units in their longitudinal vertical plane is permitted by the transverse pivotal mounting of the draft tongue mounting member 84 with respect to the male coupler member M4. It will be noted, in this connection, that upon completion of the coupling operation draft tongue 86 becomes in effect a rigid element of the female member, all pivotal movement being between the draft tongue and the male member. It should be further noted that weight bearing members 24 function as in the first modification to transfer the weight from the unwheeled end of one trailer unit to the wheeled end of the adjacent unit and also to resiliently limit the amount of rotation between the coupler units in their vertical longitudinal plane.

Figs. 14 and 15 illustrate a modified form of draft tongue mounting as applied to the male member M4 of the coupler shown in Figs. 10–13. The modified draft tongue mounting member 115 is of substantially rectangular cross section and is formed with a rectangular extension 117 at either end to fit into a similarly shaped recess 118 in the lower edge of longitudinal projections 79 of the member M4. Extensions 117 are retained in place in the recess of member 79 by means of a mounting bracket 120, so that modified mounting member 115 is rigidly secured to the male coupler member. Mounting member 115 is formed with a central longitudinally extending cylindrical opening 122 of substantially greater diameter than the cylindrical extension 87 of the draft tongue. Rubber bushings 123 having outwardly flanged end portions are fitted into opening 122 and cylindrical extension 87 is inserted through the bushings. The outer end of extension 87 is threaded to receive a nut 88 which is tightened until draft tongue 86 fits snugly against the outer surface of bushing 123. It is evident that in this construction the flange portions of bushings 123 will provide a cushion against longitudinal shocks, whereas the central cylindrical portion of these bushings will permit limited rotation of the draft tongue with respect to mounting member 115 in the longitudinal vertical plane. Operation of the modified coupler of Figs. 10–13, when equipped with the modified draft tongue mounting of Figs. 14 and 15 is the same as described above, with the exception that rotation of the draft tongue in the longitudinal vertical plane is made possible by the compressibility and resilience of bushings 123 rather than by the pivotal mounting of the draft tongue mounting member.

The invention may be modified in various respects as will occur to those skilled in the art and the exclusive use of all modifications as come within the scope of the appended claims is contemplated.

I claim:

1. In a coupling device for vehicles of the type in which the end of one vehicle is supported by the adjacent end of another vehicle, a pair of separable mating male and female members, vertical pivot means connecting one of said members to an end of a vehicle, resilient means associated with said vertical pivot means for permitting limited rotation of said one member in the transverse and longitudinal vertical planes relative to said vehicle, a central draft tongue and a pair of laterally spaced stems projecting longitudinally from said male member and positioned outwardly of the vertical pivot, said female member being formed with a central recess for lockably receiving said draft tongue and openings to slidably receive said stems, said draft tongue being pivotally mounted for rotation only about its longitudinal axis to permit relative transverse rotation between said male and female members, and resilient means forming a part of said load transmitting devices for yieldably limiting relative rotation in the transverse vertical plane between said male and female members.

2. In a coupling device for vehicles of the type in which one vehicle is supported by an end of the adjacent vehicle, a pair of separable mating male and female members, one of said members being rigidly secured to an end of a vehicle, the other member being pivotally secured to the adjacent end of a second vehicle for limited rotation about a vertical axis, resilient means associated with said vertical pivot means for permitting limited rotation of said other member in the longitudinal vertical plane relative to said second vehicle, a central draft tongue and a pair of laterally spaced stems projecting longitudinally from said male member, a transverse notch in a horizontal surface of said tongue, said female member having a central recess to receive said draft tongue and a pair of laterally spaced openings to receive said stems, cooperating surfaces of said tongue and said recess being similarly sloping, one of said sloping surfaces being opposite the notched surface of said tongue, a latch pivotally mounted within said recess and adapted to lockably engage said notch, resilient means for moving said latch into holding engagement with said notch, and manual means for moving said latch into locking engagement with said notch thereby wedging said tongue against said sloping surface and preventing any movement of said tongue with respect to said female member, said tongue being pivotally mounted for rotation about its longitudinal axis to permit relative transverse rotation between said male and female members, and resilient means associated with said spaced openings for yieldably limiting vertical movement of said stems within said openings.

3. In a coupling device for vehicles of the type in which an end of one vehicle is supported by the adjacent end of another vehicle, a pair of separable mating male and female members, one of said members being rigidly secured to an end of a vehicle, pivot means securing the other member to the adjacent end of a second vehicle for limited rotation about a vertical axis, resilient means associated with said pivot means for permitting limited universal movement of said pivoted member, a central draft tongue and a pair of laterally spaced stems projecting longitudinally from said male member, a transverse notch in a horizontal surface of said tongue, said female member having a central recess to receive said draft tongue and a pair of laterally spaced openings to receive said stems, a latch pivotally mounted within said recess and adapted to lockably engage said notch, said latch having an operating arm portion, crank means pivotally suspended from the trailer unit and engaging said operating arm whereby said latch may be manually moved into locking engagement with said notch, resilient means normally urging said crank means upwardly for moving said latch into holding engagement with said notch, said tongue being pivotally mounted for rotation about its longitudinal axis to permit relative transverse rotation between said male and female members, and resilient means associated with said spaced openings for yieldably limiting vertical movement of said stems within said openings.

4. In a coupling device for vehicles of the type in which an end of one vehicle is supported by an end of an adjacent vehicle, a pair of separable mating male and female members, one of said members having a portion rigidly secured to an end of a vehicle, vertical and transversely extending horizontal pivot means securing the other member to the adjacent end of a second vehicle for limited rotation about vertical and normally transverse horizontal axes, a draft tongue positioned outwardly of the vehicle connection projecting centrally from said male member, a recess in said female member for lockably receiving said draft tongue therein thereby to prevent relative longitudinal movement between said mating members, a pair of laterally spaced stems projecting from one of said mating members, and laterally spaced openings in the other member for receiving said stems, and resilient means associated with said spaced openings for yieldably limiting relative rotation between said male and female members in the transverse vertical plane.

5. In a coupling device for vehicles of the type in which an end of one vehicle is supported by the adjacent end of another vehicle, a pair of separable mating male and female members, one of said members being pivotally secured to an end of a vehicle for limited rotation about a vertical axis, the other member being pivotally secured to an adjacent end of a second vehicle for limited rotation about a horizontal axis, a draft tongue centrally projecting from one of said mating members and positioned outwardly of its pivotal connection with the vehicle, a recess in said female member for lockably receiving said draft tongue thereby to prevent relative longitudinal movement between said mating members, a pair of laterally spaced stems projecting from one of said mating members, laterally spaced openings in the other member for receiving said stems and means associated with said spaced openings for yieldably limiting relative rotation in the transverse vertical plane between the male and female members.

6. In a coupling device for vehicles of the type in which an end of one vehicle is supported by an end of an adjacent vehicle, a pair of separable mating male and female members, one of said members being rigidly secured to an end of a vehicle, the other member being pivotally secured to the adjacent end of a second vehicle for rotation about a vertical axis, load transmitting devices comprising a pair of laterally spaced stems projecting longitudinally from said male member and a pair of cooperating resiliently lined openings in said female member for receiving said stems, a draft tongue pivotally mounted on said male member for rotation about its longitudinal axis and about a normally transverse horizontal axis substantially coincident with the transverse axis of said load transmitting device, a recess in said female member for lockably receiving said draft tongue therein thereby to secure said mating members in draft and vertical load transmitting relation each with the other.

7. In a coupling device for vehicles of the type in which an end of one vehicle is supported by an end of an adjacent vehicle, a pair of separable mating male and female members each having vehicle-attaching means, the vehicle-attaching means for one of the members providing a rigid connection therewith, and the vehicle-attaching means for the other member providing a pivotal connection therewith permitting rotation about a vertical axis, a draft tongue pivotally mounted on said male member for rotation about a normally transverse horizontal axis and about its longitudinal axis, resilient means associated with the pivotal mounting for permitting limited longitudinal movement of the tongue with respect to the male member, a recess in said female member for lockably receiving said draft tongue therein thereby to restrict relative longitudinal movement between said mating members, a pair of laterally spaced stems projecting from one of said mating members, laterally spaced openings in the other member for receiving said stems, and resilient means associated with said openings for yieldably limiting relative rotation of the male and female members about their longitudinal horizontal axes.

8. In a coupling device for vehicles of the type in which the end of one vehicle is supported by the adjacent end of another vehicle, a pair of separable mating male and female members each having vehicle-attaching parts to be secured respectively to adjacent vehicles, a draft tongue structure centrally projecting from the male member and positioned outwardly from its vehicle-attaching part, said draft tongue being axially rotatable relative to the male member to permit rotation in the transverse vertical plane between said male member and the female member, said female member including a wall portion formed with a recess for receiving said draft tongue, a locking means carried by the wall portion of the female member for lockably engaging said draft tongue, a pair of laterally spaced load transmitting devices each comprising a longitudinally extending stem secured to the male member, and openings in the female member to receive said stems.

9. In a coupling device for vehicles of the type in which the end of one vehicle is supported by the adjacent end of another vehicle, a pair of separable mating male and female members each having vehicle-attaching parts to be secured respectively to adjacent vehicles, a draft tongue structure centrally projecting from the male member and positioned outwardly from its vehicle-attaching part, said draft tongue being axially rotatable relative to the male member to permit rotation in the transverse vertical plane between said male member and the female member, said female member including a wall portion formed with a recess for receiving said draft tongue, a locking means carried by the wall portion of the female member for lockably engaging said draft tongue, a pair of laterally spaced load transmitting devices each comprising a longitudinally extending stem secured to the male member, openings in the female member to receive said stems, and resilient means forming a part of the load transmitting device for yieldably limiting rotation in the transverse and longitudinal vertical planes.

References Cited in the file of this patent

UNITED STATES PATENTS

| | | |
|---|---|---|
| 649,991 | Lecompte | May 22, 1900 |
| 1,188,119 | Tyrrell | June 20, 1916 |
| 1,333,384 | Buller | Mar. 9, 1920 |
| 1,891,660 | Tomlinson | Dec. 20, 1932 |
| 1,989,894 | Tomlinson | Feb. 5, 1935 |
| 2,133,065 | Weber | Oct. 11, 1938 |
| 2,512,110 | McPeck | June 20, 1950 |

FOREIGN PATENTS

| | | |
|---|---|---|
| 305,033 | Germany | Apr. 18, 1922 |
| 538,166 | Great Britain | July 23, 1941 |